United States Patent [19]
Long

[11] Patent Number: 6,120,818
[45] Date of Patent: Sep. 19, 2000

[54] TREATMENT OF MEAT BY CAPACITOR DISCHARGE

[75] Inventor: John B. Long, Sarasota, Fla.

[73] Assignee: Hydrodyne Incorporated, Sarasota, Fla.

[21] Appl. No.: 09/030,319

[22] Filed: Feb. 25, 1998

Related U.S. Application Data

[60] Provisional application No. 60/048,564, Jun. 4, 1997.

[51] Int. Cl.$^7$ .................................................. A22C 21/00
[52] U.S. Cl. ......................... 426/238; 426/234; 426/237; 452/141
[58] Field of Search ...................... 99/358, 451, DIG. 14; 426/237, 238, 244, 234; 452/141

[56] References Cited

U.S. PATENT DOCUMENTS

| | | | |
|---|---|---|---|
| 2,078,641 | 4/1937 | Spencer | 99/427 |
| 3,093,770 | 6/1963 | Wesley et al. | |
| 3,220,873 | 11/1965 | Wesley | |
| 3,492,688 | 2/1970 | Godfrey | |
| 3,594,115 | 7/1971 | Wesley et al. | |
| 3,711,896 | 1/1973 | Guberman et al. | |
| 4,244,284 | 1/1981 | Flavan, Jr. et al. | 426/244 |
| 4,458,153 | 7/1984 | Wesley | |
| 5,026,484 | 6/1991 | Juvan | |
| 5,273,766 | 12/1993 | Long | |
| 5,328,403 | 7/1994 | Long | 426/58 |
| 5,368,724 | 11/1994 | Ayers et al. | |
| 5,397,961 | 3/1995 | Ayers et al. | |
| 5,588,357 | 12/1996 | Tomikawa | |

FOREIGN PATENT DOCUMENTS

| | | |
|---|---|---|
| 0 516 080 | 12/1992 | European Pat. Off. |
| 9303622 | 3/1993 | WIPO |

*Primary Examiner*—Gabrielle Brouillette
*Assistant Examiner*—Hao Mai
*Attorney, Agent, or Firm*—Brody And Neimark

[57] ABSTRACT

A method and apparatus for instantly tenderizing meat employs a shock wave produced by an underwater electrical discharge through an electrode gap from a capacitor bank. To optimize the shock wave shape for tenderizing, the electrical pulse may be shaped by using timing the discharge of the capacitor bank.

5 Claims, 5 Drawing Sheets

TREATMENT OF MEAT BY CAPACITOR DISCHARGE

CROSS-REFERENCE TO RELATED APPLICATION

This application claims the benefit of U.S. Provisional Application No. 60/048,564, filed on Jun. 4, 1997.

FIELD OF THE INVENTION

The present invention relates to the treatment of meat by exposing the meat to a shock wave, and especially for tenderizing meat and/or killing bacteria in the meat by such a treatment.

BACKGROUND OF THE INVENTION

The tenderizing of meat and the destruction of microorganisms on and in meat can be accompanied by generating a shock wave in a non-compressible fluid and allowing the shock wave to pass through meat, which is preferably sealed in a plastic bag for cleanliness and ease of handling.

The tenderizing effect can be roughly doubled by placing the meat against a surface in the water, such as heavy steel plate, which reflects the wave back through the meat. Thus, the shock wave front passes through the meat, reflects from the surface supporting the meat, and passes a second time through the meat, crossing a portion of the still incoming wave. The maximum effect occurs in the region of the supported meat where the reflected wave crosses the incoming wave.

For uniform shock intensity, the inside of a heavy steel hemispherical tank can be lined with meat packages, the tank filled with water, and an explosive charge be placed at the center point and detonated. The shock wave will travel outward through the water, tenderizing all the meat relatively evenly.

Tenderizing meat in this manner has many advantages, including instant tenderization, low cost, and saving of energy, as well as killing of bacteria. There are no unsavory or known unhealthy results to the meat.

Explosive meat tenderizing is discussed in U.S. Pat. Nos. 5,328,403 and 5,273,766, both of which are entirely incorporated herein by reference. The disclosed process is known commercially as the Hydrodyne Process. In the exemplary embodiments disclosed by these patents, the meat is supported adjacent the shock reflective surface, and the shock wave is produced by the detonation of a high explosive. It was found that optimum results were accomplished in both tenderizing and destruction of microorganisms when the peak pressure in the shock front occurred at times less than ten microseconds from the time of detonation.

The use of chemical explosives, such as was disclosed by the incorporated patents, has certain drawbacks. One is safety. Any explosive must be handled and used carefully to avoid accidents, and this increases costs. Also, there is always the possibility of injury, even if such possibility is remote.

A second drawback is cycling time. While a chemical explosion is of course quite brief, the time between explosions is limited by the need to replace the exploded charge with another charge after re-packing the holding tank with packaged meat and water, and the time for personnel to move out of harm's way after the charge is set. In theory packed holding tanks could be moved, one after another, into a single firing position where a series of charges would be exploded, but it is difficult to build a mechanism which can automatically position and detonate a series of explosive charges in a carefully defined position.

The use of chemical explosives also imposes certain size requirements, and thus makes the possibility of miniaturization and home use impractical.

SUMMARY OF THE INVENTION

Accordingly, the present invention has an object, among others, to overcome deficiencies in the prior art such as noted above.

The invention thus provides a method of producing an explosive shock wave for tenderizing meat and/or killing micro-organism in meat by producing a discharge of an electric arc between electrodes near the meat. Preferably, the electrodes are submerged in water along with the meat.

In order to produce a suitable shock wave the electric arc must produce an adequate amount of energy, comparable to that produced by chemical explosives, and achieve a peak pressure in the shock front in a time period comparable to that produced by chemical explosives. Lightning demonstrates that an explosive electrical discharge can release considerable energy in a short time. In principle, there is no reason why meat cannot be tenderized by an electric arc discharge as well as by chemical explosions.

To obtain this result the present invention stores electrical energy in a capacitor or a bank of capacitors, which can be discharged in a few microseconds through two or more electrodes. Virtually all of the energy stored in the capacitor appears in the space between the electrodes in the same brief interval of time, generating an explosion or the equivalent thereof and high outward pressure resulting in a shock wave.

A sufficiently rapid and energetic discharge to the electrodes can be achieved by adjusting the resistance, capacitance, and inductance of the system. With proper allocation of these values the shock wave produced by an electrical discharge can duplicate or even surpass the effects produced by chemical explosives; and it has several advantages.

Some advantages of using an electric energy system as compared to the chemical energy produced by conventional high explosives are as follows.

(1) The time required for placing the explosive in the tank, and exercising the proper safety procedures required with conventional high explosives, consumes minutes between explosive food processing events. Few of these time consuming procedures occur with the use of capacitor discharged energy.

Capacitors can be charged and discharged several times per second, so the time between tenderizing explosions is limited only by the time required to move the product into the region where the shock wave is produced.

With conventional explosives the time between explosive events is large, and so a large amount of product per event has been used so as to keep up with a production line in an existing meat or food producing plant. This requires large and extremely sturdy pieces of equipment, which are costly. Miniaturization is impractical.

A chemical explosive tenderizing set-up can tenderize approximately 600 pounds of meat in five minutes, in a batch operation, for an average of 2 pounds per second. With electric-discharge explosive tenderizing, it is possible to tenderize the meat on a continuous, semi-continuous or intermittent production line where 30 pounds of product go by every 10 seconds, for an average of 3 pounds per second. On the electric arc production-line system, where an electric discharge explosion occurs every 10 seconds, a much smaller amount of energy per event is required, the sturdiness of the equipment need not be so great, there is less danger, and the building and workers are subjected to less disruptive banging because the smaller explosions are easier to damp.

(2) The cost of explosives plus detonator for a 600 pound batch of product is about $0.007 per pound. The cost of electricity for the same amount of product is about $0.0002 per pound.

(3) Experiments have shown that an optimum wave form for meat tenderizing is one which displays a very short rise time (time from zero pressure to peak pressure) and which lasts a sufficiently long time that the length of the shock wave will accommodate the thickness of the meat products in the production line; this insures that the intensity will double when the wave reflects back through the meat. The requirements may vary depending upon the response of individual products to the shock wave.

The destruction of different kinds of microorganisms may require different wave forms for optimum or maximum results. When using explosives, the wave form can be varied by using different molecular type explosives, or where binary explosives are used, by changing the ratio of the components in the mixture. Molecular explosives typically produce a shorter time from zero to peak pressure. Small variations in wavelength can be achieved by varying the shape of the explosive charge.

More flexibility is possible when using an electric capacitor arc system. Increasing the voltage in the capacitor bank, composed of several smaller capacitor storage units, decreases the time of discharge, and thus decreases the time from zero to peak pressure in the shock front. The time required for discharge of a capacitor bank, given a chosen voltage, is a function of the sum of the time for discharge of each of the smaller component units. If a separate set of electrodes is provided for each unit of the capacitor bank, and these are placed in an array in the water, the units can be fired simultaneously and a much shorter time from zero to peak pressure can be achieved. If it is desired to lengthen the wave form, delaying the firing time of some of the electrodes in the array will accomplish this. Placing reflectors behind the electrodes will produce a focusing effect, and place the energy where the food product is located.

(4) When a chemical explosive is detonated under water, a portion of the energy is devoted to the shock wave, the balance to the resultant gas bubble. Binary explosives typically produce 25% to 30% of the total released energy in the shock wave. Molecular explosives can produce 55% of the energy or more in the shock wave because of their more rapid detonation velocity.

In the equipment of U.S. Pat. No. 5,328,403, the gas bubble produced with chemical explosives is more than one thousand times the volume of the explosive itself. This sudden expansion of gas moves a portion of the water in the tank upwardly, producing a force in excess of 20 tons both upwardly and downwardly. The stoutness of the construction of such Hydrodyne equipment is a result of this phenomenon. When a capacitor powered arc is used, the bubble produced is a result of water vapor produced by the heat from the arc. The resulting bubble is relatively quite small and easily contained. Therefore, the force applied to the equipment is much smaller than that resulting from a chemical explosive, permitting a less expensive and simpler apparatus. The balance of the energy is used to produce a shock wave, approximately 30%, and in radiation from the electric arc.

Perhaps the main advantage of using an electric capacitor arc system is that it can be carried out using a mechanized conveyor for carrying the food products. The electric discharge system permits the use of a smaller amount of energy, used in bursts that match the speed of the production line. This results in smaller and less expensive equipment which can be more easily blended with equipment and procedures in existing food processing production lines.

BRIEF DESCRIPTION OF THE DRAWING

The above and other objects and the nature and advantages of the present invention will become more apparent from the following detailed description of preferred embodiments taken in conjunction with drawings, wherein.

DETAILED DESCRIPTION OF THE PREFERRED EMBODIMENT

Figure 1A:
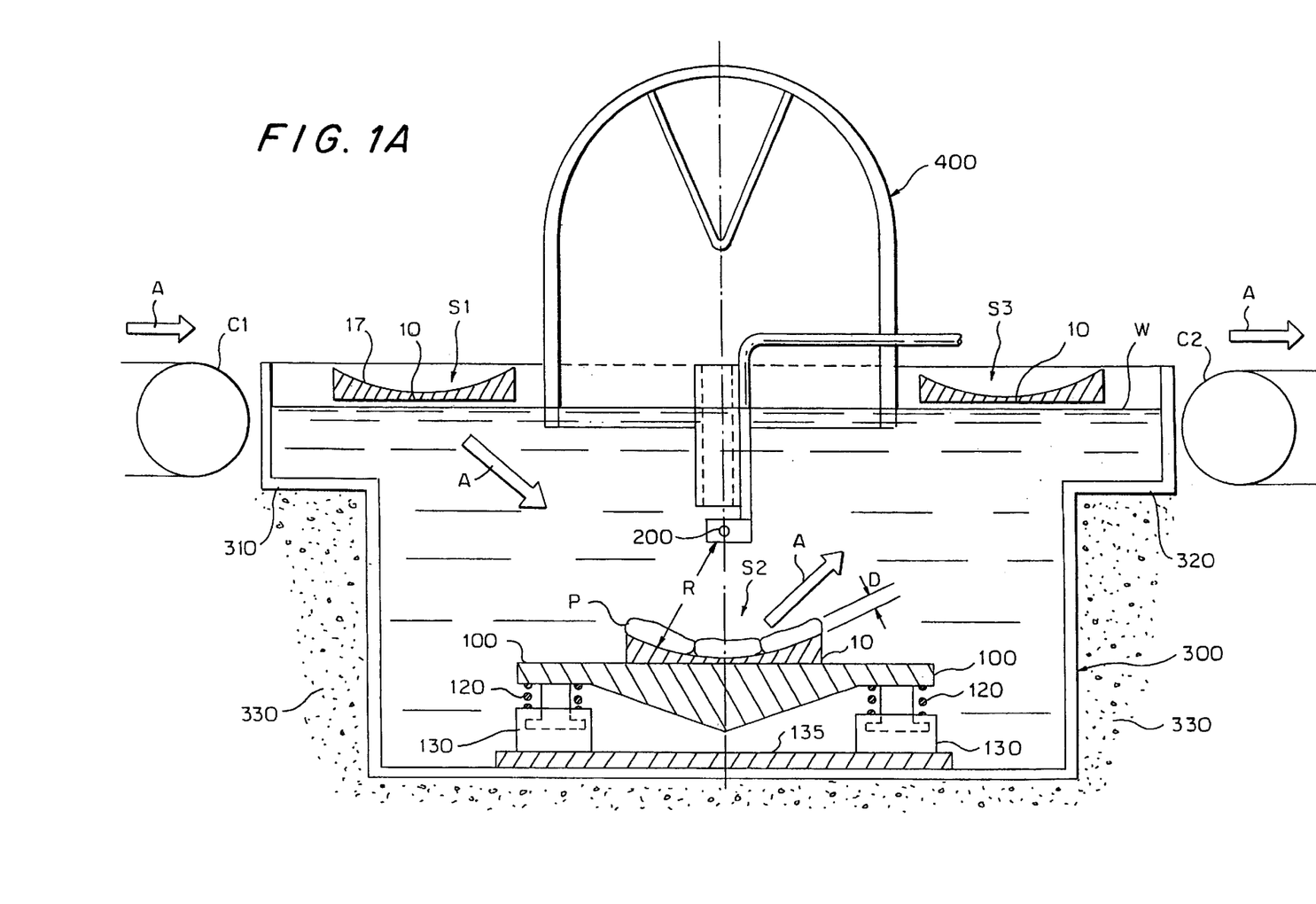
FIG. 1A is an elevational, cross-sectional, partially schematic view of an embodiment of the present invention.
Figure 1B:
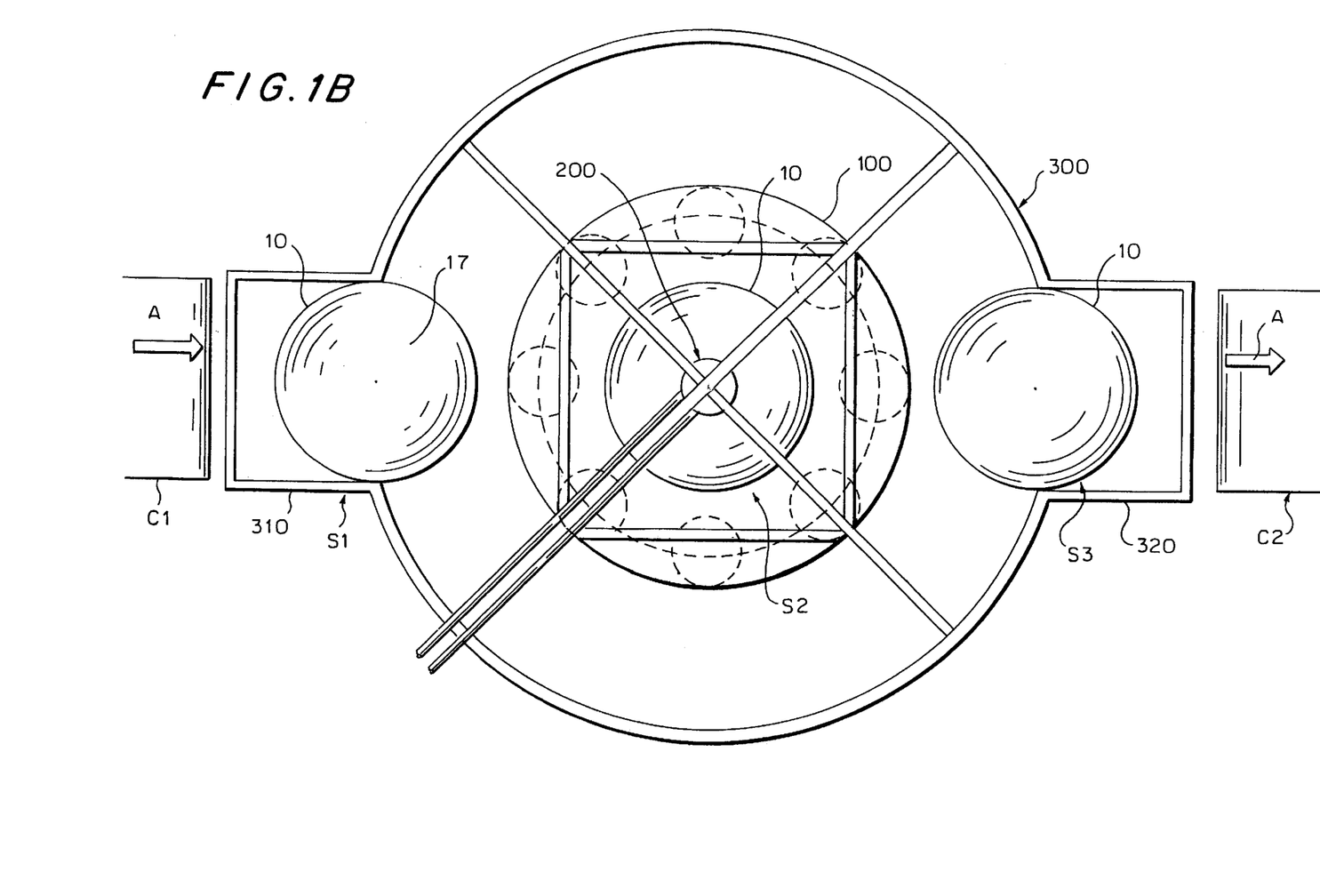
FIG. 1B is a plan view of the embodiment of FIG. 1A.

FIGS. 1A and 1B illustrate a preferred embodiment of the invention, a capacitive-discharge, spark-explosion shock wave apparatus for tenderizing meat. Meat product packages P arrive from a first conveyor belt C1, e.g. a conventional belt conveyor, and are loaded onto a shock-wave reflective pallet 10, serving as a shock wave reflective surface, preferably made of heavy stainless steel or other rugged, shock-resisting material, which is held at a loading position S1 that is preferably at the end of the conveyor C1 as shown. The product is loaded, either by hand or automatically, onto the upper surface 17 of the pallet 10, which surface 17 preferably is hemi-spherical in shape (similar to a concave shaving mirror) with a radius R.

The packages P of meat preferably are loaded over the surface 17 in a generally uniform layer and to a depth not exceeding a distance D from the surface 17. The meat product P is preferably wrapped in heavy, sealed, water-tight plastic bags without any air bubbles inside, for sanitary reasons and to prevent local "burning" of the product where the shock wave would be concentrated by an air bubble, which would act like a is lens to focus the shock wave.

After being loaded the pallet 10 is moved from loading station S1 to treatment station S2 by a suitable mechanism (not shown in FIG. 1), such as a second conveyor or other moving mechanism which supports the pallets 10; the path of the pallets 10 and product P is indicated by arrows A in FIG. 1. Station S2 is under the surface level of water inside a tank 300, preferably made of stainless steel and embedded in concrete 330 as illustrated in the drawing. The tank 300 preferably is cylindrical and includes two wings 310, 320 for the loading station S1 and an unloading station S3.

A pair of electrodes 200 is located above the pallet 10 at a position which is preferably equidistant from all parts of the surface 17 of the pallet 10 located at treatment station S2, i.e. at the center of the sphere of which the surface 17 is a part. When the capacitors (not shown in FIG. 1) are discharged between the two electrodes 200, the resulting underwater spark causes a shock wave to propagate outward through the water and hit the product evenly all over the surface 17, that is with substantially uniform energy and at substantially one instant of time.

The energy and force of the shock wave are great. At station S2 the pallet 10 rests on an explosion support or cushioning table 100 which is disposed at the bottom of a water pit 200 filled with water W. The table 100 preferably supported by springs 120 and hydraulic dampers or dashpots 130 which absorb the energy of the explosion when the spark occurs, although other types of energy absorbing supports, such as shown in the aforementioned U.S. patents, can be used instead. The great force on the pallet 10 and table 100 forces the table 100 downwardly; despite the water underneath, which must be pushed aside and tends to damp the downward motion, the table 100 would crash into the bottom of the tank 300 unless the springs 120 were quite long or stiff, so the additional resistance of the dampers 130 is desirably added.

The dampers 130 preferably are hydraulic dampers using the water already in the tank 300, having a piston 131, coupled to or resting against the table 100, which moves inside a cylinder 133, coupled to the bottom of the tank 300. The bottom coupling can be through a bottom plate 135. As water is forced through the gap between the piston and cylinder, explosion energy is absorbed. Either the piston or the cylinder may include holes to supplement or supplant the piston-bore gap.

Because the springs absorb considerable energy in being compressed by the explosion, check valves (one-way-flow valves) may be incorporated into the dampers to damp the upward rebound of the table 100. For example, the piston or cylinder might have a check valve which permits flow out of the bore but not into the bore.

Alternatively, the entire table 100 can be made into an hydraulic damper by surrounding the table perimeter with a large cylinder (not shown) with controlled leakage provided by holes in the cylinder or in the table 100 peripheral to the pallet 10. The dampers 130 may be of any conventional type, and in alternative embodiments, the damper can be pneumatic, employ rubbing solid surface friction, and so on.

Because the meat product P is mostly water, the shock wave travels through it basically unimpeded until it reaches the steel pallet, where a large part of the shock wave reflects back up toward the electrodes 200. An explosion shield 400 above the electrodes 200 absorbs the resultant geyser. The shield 400 may optionally be mounted on a shock-absorbing mounting (not shown) optionally including its own springs and dampers.

The force of the explosion, being into the surface 17 of the pallet 10, will not force the product P off into the water of the tank 300. However, turbulence resulting from the explosion may displace it. Also, the product P is of nearly the same density as the water in the tank 300 and may wash off the surface 17 when the pallet moves in the direction A through the water from station to station. If needed, the product P can be retained on the surface 17 by any suitable means, and the provision of such a product retainer is within the scope of the present invention.

Because of the dashpots 130, the coil springs 120 can be quite weak, exerting only enough force to reliably lift the table 100 back to its initial position as shown in FIG. 1A where the surface 17 is at the radius distance R from the electrodes 200.

FIG. 1B shows that the dampers or dashpots 130 are distributed radially about the vertical line through the electrodes 200. Preferably there are a total of sixteen spaced at 22.5-degree intervals (although only half that number are illustrated). The downward-deflection and rebound distance is preferably about three inches (8 cm).

Figure 2A:
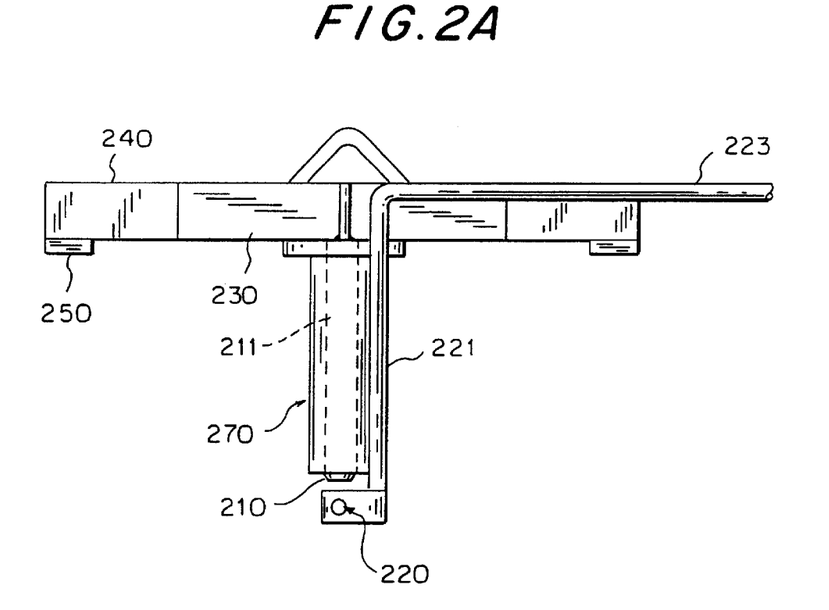
FIG. 2A is an elevational view of an electrode holder.
Figure 2B:
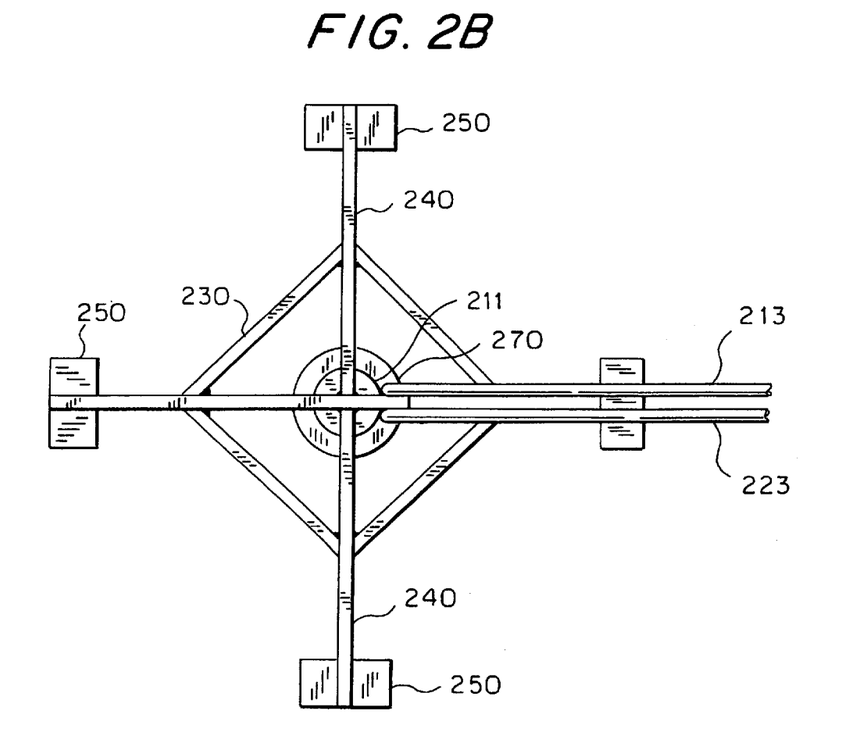
FIG. 2B is a plan view of the electrode holder.

FIGS. 2A and 2B illustrate in more detail the electrodes 200 and their supporting structure. Each electrode ends at a respective electrode tip 210, 220. Electrode tip 210 preferably remains at ground potential along with the supporting frame and the surroundings; voltage from the capacitors is discharged through tip 220. Although the drawing shows two simple vertically opposed electrode tips, various arrangements are possible, e.g. one central electrode surrounded by a plurality of arms of the other electrode, in the manner of aircraft spark plugs. Also, one central ground electrode can be surrounded by a number of electrodes each connected to a different capacitor.

Tip 220 is connected through a vertical riser portion 221 of a cable 223, preferably a heavy insulated cable. The riser 221 can be a solid bar instead of a portion of cable. Regardless, the riser 221 is suitably insulated from a central ground riser 211 by a tube 270 which surrounds the central grounded riser 211. The grounded riser 211 is preferably welded directly to the support frame of stainless steel, which includes arms 240 having support pads 250 at their outboard ends, and braces 230. Cable 223 couples the grounded riser 211 and tip 210 to the capacitor banks.

Figure 3:
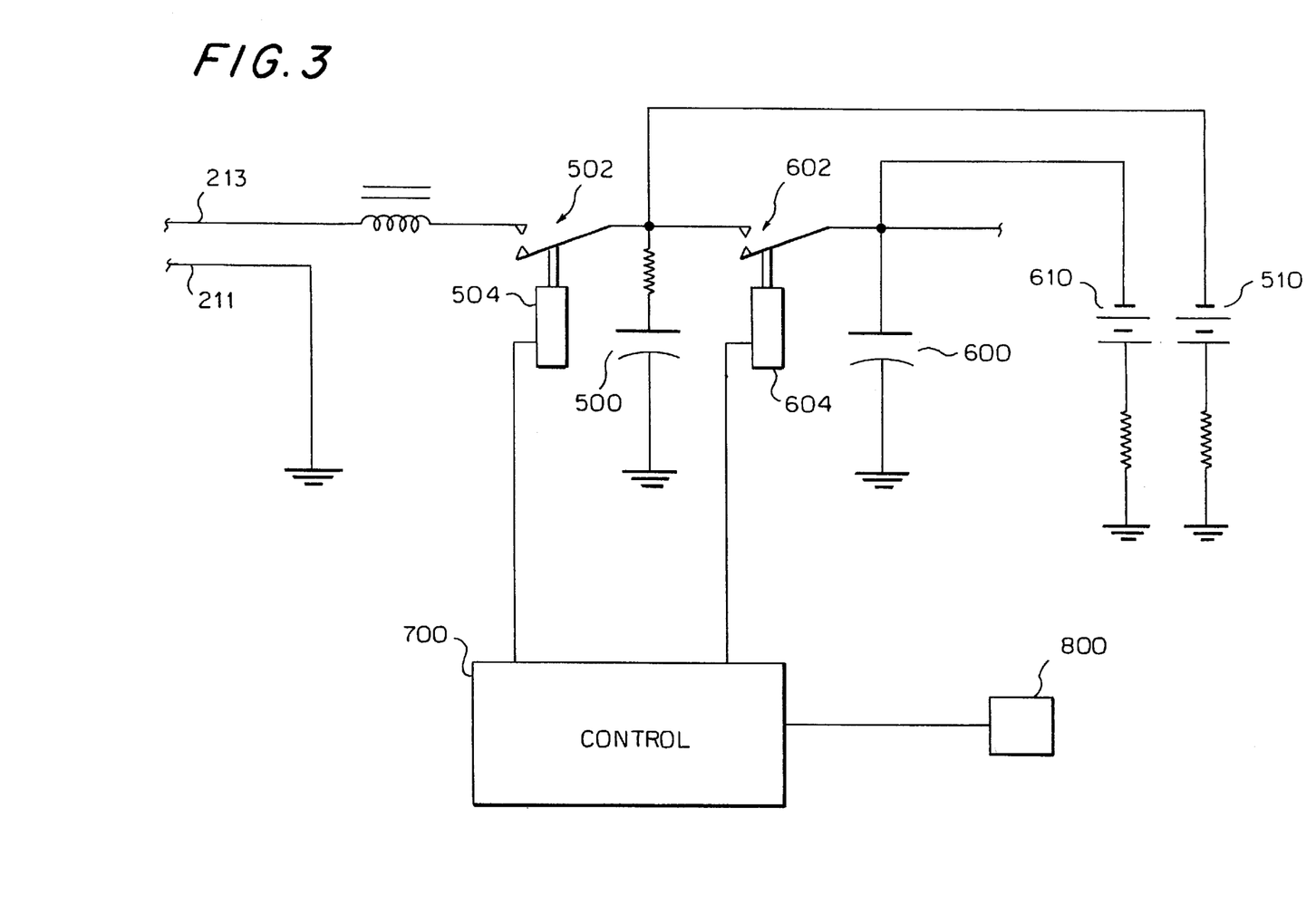
FIG. 3 is a schematic overview of an embodiment of circuitry of the present invention.

FIG. 3 schematically illustrates the capacitors including a first capacitor 500 and a second capacitor 600 connectable to the cable 223 via respective switches 502, 602 closable by actuators 504, 604. The actuators 504, 604 and switches 502, 602 may be embodied as electromechanical relays, solid-state switches such as power transistors, or any other conventional or non-conventional means for controlling large currents. The capacitors 500, 600 are charged by chargers 510, 610, which may include internal or external resistances. The schematic indication by battery symbols is not meant to limit the chargers to batteries; any voltage source can be used.

The capacitors 500, 600, may be augmented in the present invention by additional capacitors (not shown) coupled to the cable 213 either in parallel or in series like the illustrated capacitors 500, 600. When the capacitor bank is fully charged and the meat packages P on the pallet 10 are at position S2, the switches 502, 602 can be closed to send current to the electrodes 200 shown in FIG. 1A. The shape of the electrical pulse can be controlled by closing the switches of the capacitor bank according to a predetermined timing sequence. In addition, the inherent, internal, or added values of capacitance, inductance, and resistance in the entire circuit will also contribute to shaping the pulse, in a manner that can be predicted according to the well-known methods of electrical engineering. Capacitance, inductance, and resistance are the basic elements of any passive circuit, and can be placed into a circuit as discrete elements at will.

Activators 504, 604, are both preferably coupled to an active control system 700 which controls the switch closure timing, and which preferably responds to a signal from a sensor 800 coupled to the conveyors C1 and C2, to a hand-operated switch, or to some other indicator of the product P being in proper position.

The circuitry of FIG. 3 is preferably made so that the electrical pulse into the cable 213 has the correct shape for optimizing the shock pulse in the water, which impinges on the product. The shape of the shock pulse (e.g., overpressure as a function of time) will not match exactly the electrical pulse (e.g., voltage as a function of time) because the electrical energy must be converted into pressure energy, but some of the energy goes into producing a steam bubble, creating ozone, etc. The present invention contemplates a method of providing the circuitry of FIG. 3 such that a predetermined shock pulse contacts the product P.

The apparatus of FIG. 3 can be duplicated in case there are several electrodes, e.g., a number surrounding a central ground electrode. A small capacitor can discharge faster than a larger one, shortening the pulse's rise time.

Returning to FIGS. 1A and 1B, after treatment of the meat, the packages P are conveyed to station S3 and unloaded to a discharge conveyor C2.

The electric-discharge apparatus of the present invention can be used in either a batch operation (as described in the incorporated U.S. Pat. Nos. '403 and '766) or in a continuous process as described above, or in a semi-continuous or intermittent operation. For batch operation, the equipment should be much larger than in semi-continuous or intermittent operation or a continuous operation, the tanks can be much smaller.

Besides the preferred embodiment described above and illustrated, other systems for carrying out continuous or intermittent operations are within the scope of the present invention, and still others will be readily apparent to those skilled in the art from a consideration of this disclosure.

One example is a continuous conveyor line in which conveyor segments are provided with hemispherical depressions into which the meat packages are placed, and which continuously or intermittently run through the tank beneath the device of FIG. 1, and then out from the other side of the tank. At the treatment position or positions, each hemisphere mates with another hemisphere underwater. The electrodes can be built into the hemispheres.

Figure 4:
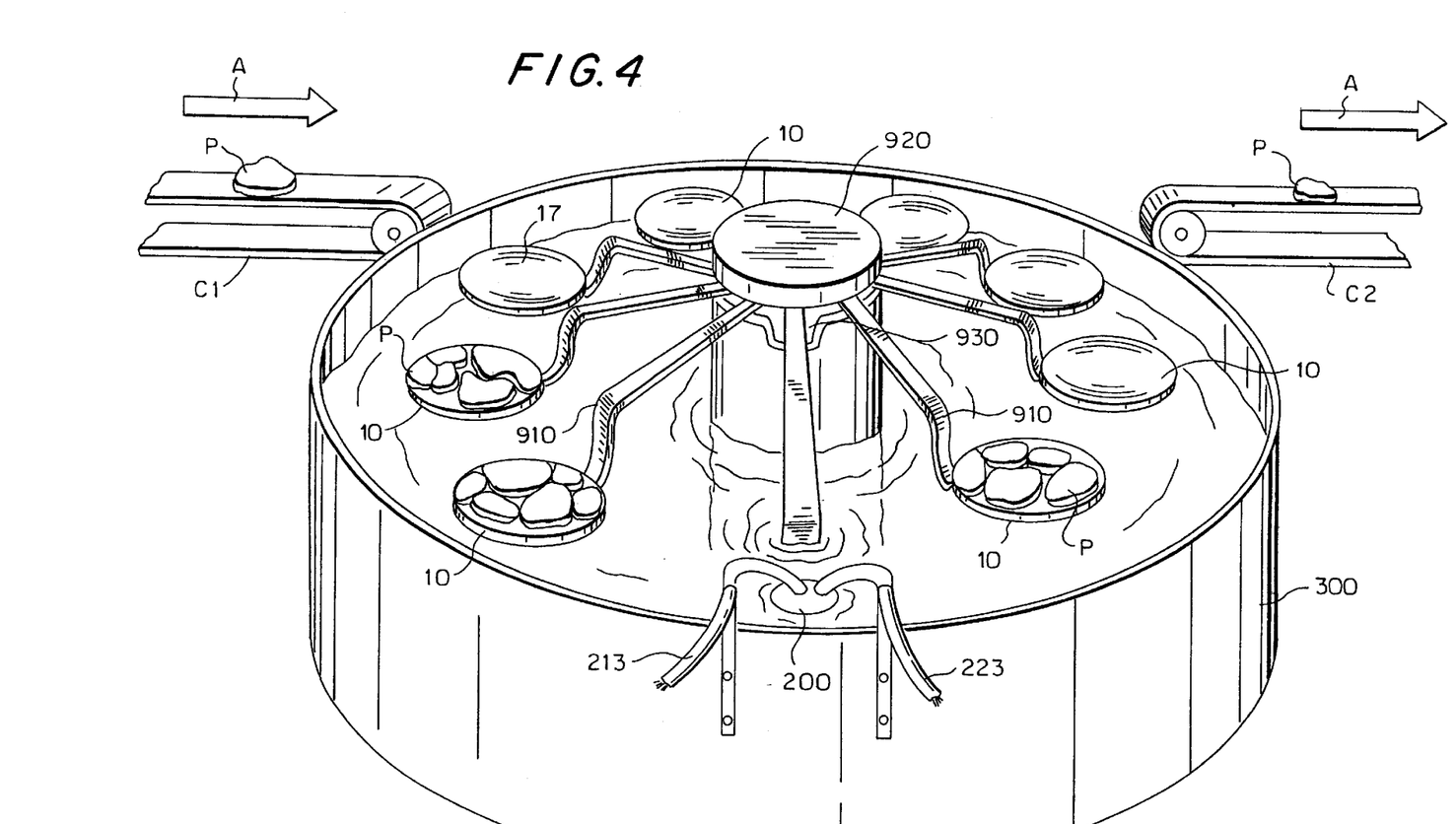
FIG. 4 is a perspective view of an alternate embodiment of the invention.

FIG. 4 shows an alternative embodiment of the present invention which employs a rotary carousel 900. The pallets 10 are fastened on the ends of arms 910 extending radially from a central hub 920 which contains the carousel mechanism 930, which rotates all the arms 910 together in the counterclockwise direction as seen in FIG. 4. The arms 910 may turn continuously or intermittently.

Meat product packages P arrive on conveyor belt C1 at the left and are unloaded onto an adjacent one of the pallets 10 whose upper surface 17 is empty. The loading may be done by hand or by automatic equipment. The loaded pallet 10 travels part way around the carousel circle until it reaches the position for treatment, which is shown closest to the observer in FIG. 4. There the mechanism 930 causes the arm 910 to dip downward, lowering the pallet 10 and product P into the water in tank 300 to pass underneath electrodes 200 which are immersed under the surface of the water in the tank 300. As in the embodiment of FIG. 1, the radius of the pallet surface 17 is preferably equal to the distance to the electrodes 200.

When the pallet 10 is centered under the electrodes 200, the capacitor bank (not shown in FIG. 4) is discharged into cables 213, 223 to create a spark at the electrodes 200, causing a shock wave to travel down to the pallet 10 to tenderize the meat product P. The pallet 10 with the tenderized product P then moves to the right, up out of the water, and around to near the second conveyor belt C2, onto which the treated meat product is placed.

A splash deflector like that shown in FIG. 1a, though not illustrated in FIG. 4, is preferably placed above the electrodes 200. The tank 300 may include baffles and dampers to lessen the shock of the explosion which travels through the water and reduces the vibration to which the loaders and unloaders are exposed.

The arrangement of FIG. 4 has the advantage that the pallet loading and unloading operations are far from the explosion, and also several pallets 10 can be near to the is conveyor belts C1 and C2. This permits faster food processing because there is room for several workers or robots at either end to load and unload the pallets 10.

In an alternative embodiment to that illustrated in FIG. 4, the tank may be smaller in size and restricted to just the area where the arm 910 lowers the food product under water. In another possible embodiment, the arms may travel within a tilted plane so that the pallets rise and fall while making a circular motion, as in some amusement park rides, making for a simpler mechanism 930.

Also, the pallets 10 can be combined with respective individual tanks 300, shields 400, and electrodes 200, to form tank/pallet/shield/electrode units, and a mechanism can be provided which moves each unit in a circle toward a firing position at which the electrodes would make contact with the capacitor for discharge.

In still another embodiment, also not shown, the pallets 10 may float around the perimeter of the tank 300 and be forced under water by lowering an integral explosion shield and electrode assembly onto the pallets.

In general, the present invention includes any and all arrangements in which the pallets 10 move generally in a circle while being loaded and unloaded and during the explosive treatment.

The present invention is applicable not only to meat, but to any other product or substance which can benefit from shock-wave treatment.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

The industrial applicability is in tenderizing meat. The problems solved by the invention are slow cycling, danger, and expense of chemical explosive tenderizing.

What is claimed is:

1. In a method of treating meat comprising immersing packaged substantially boneless meat supported in an explosion retaining tank adjacent a shock-wave reflective surface and within a bath of inert liquid, and subjecting said meat to an explosive discharge within said liquid to generate and apply a shock front pressure wave propagated through the inert liquid and through the meat while maintaining said meat supported, the improvement wherein said explosive discharge is generated by passing a pulse of electricity through a gap between at least two electrodes within said inert liquid, and said explosive discharge is of an intensity sufficient to kill bacteria in or on said meat, to tenderize said meat, or to both tenderize said meat and kill bacteria in or on said meat;

wherein said shock-wave reflective surface comprises part of a conveyor system moving from a meat loading position outside of said inert liquid to a meat unloading position outside of said inert liquid, through a meat treating position within said inert liquid and disposed beneath said electrodes, said method further comprising loading said meat at said loading position so that said meat is supported adjacent said shock-wave reflective surface, moving said shock-wave reflective surface with said meat supported adjacent thereto downwardly into said inert liquid and beneath said electrodes in a rotary path, carrying out said explosive discharge on said meat, passing said meat to said unloading position, and unloading said meat at said unloading position.

2. The method of claim 1 wherein said passing a pulse between the electrodes further comprises closing a circuit containing arranged elements of capacitants, inductants, resistance to generate the pulse having a first predetermined pulse shape adapted to generate the shock front pressure wave having a second predetermined pulse shape.

3. The method according to claim 1, wherein said passing said pulse of electricity through said gap comprises closing a circuit containing arranged active electrical elements to generate the pulse having a first predetermined pulse shape adapted to generate said shock front pressure wave.

4. The method of claim 3, including closing at least one switch in response to a sensor signal.

5. The method of claim 1 wherein said inert liquid is water, and said meat is packaged in a plastic wrapping.

* * * * *